United States Patent [19]

Fernandez et al.

[11] 4,190,072
[45] Feb. 26, 1980

[54] UNDERWATER STORAGE ASSEMBLY

[75] Inventors: Ramon J. Fernandez; John S. Kahl, both of Houston, Tex.

[73] Assignee: Brown & Root, Inc., Houston, Tex.

[21] Appl. No.: 950,734

[22] Filed: Oct. 12, 1978

Related U.S. Application Data

[62] Division of Ser. No. 718,981, Aug. 30, 1976, Pat. No. 4,141,377.

[51] Int. Cl.² ............................................... B65G 5/00
[52] U.S. Cl. .................................. 137/236 S; 405/59; 405/210
[58] Field of Search ................... 137/236, 255; 405/59, 405/210; 114/257

[56] References Cited

U.S. PATENT DOCUMENTS

| | | | |
|---|---|---|---|
| 3,292,695 | 12/1966 | Haeber | 114/257 X |
| 3,727,418 | 4/1973 | Glazier | 405/210 X |
| 4,007,700 | 2/1977 | Haynes | 405/210 X |

FOREIGN PATENT DOCUMENTS 777644 6/1957 United Kingdom.

*Primary Examiner*—Alan Cohan
*Attorney, Agent, or Firm*—Kenway & Jenney

[57] ABSTRACT

An underwater storage assembly comprising a plurality of tanks secured on a skid is described. The tanks are each divided into two compartments by flexible membranes secured to the inner walls of the tanks. One compartment has an open passage to the surrounding seawater while the second compartment is fluid-tight and expands as a fluid, petroleum, is pumped into it. The tanks are elevated at one end to enable fluid to be stored and discharged more easily.

3 Claims, 6 Drawing Figures

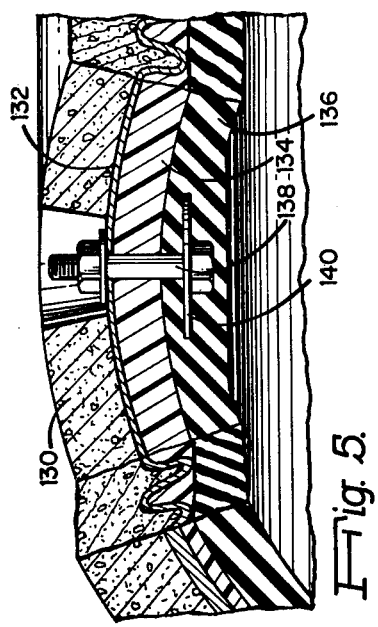
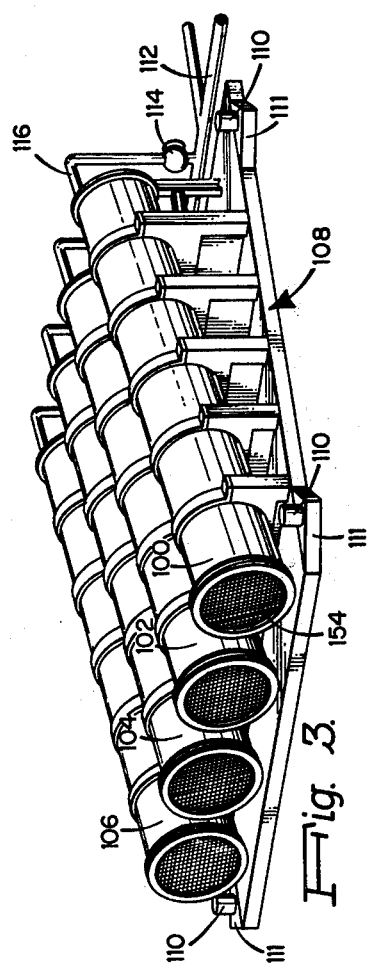
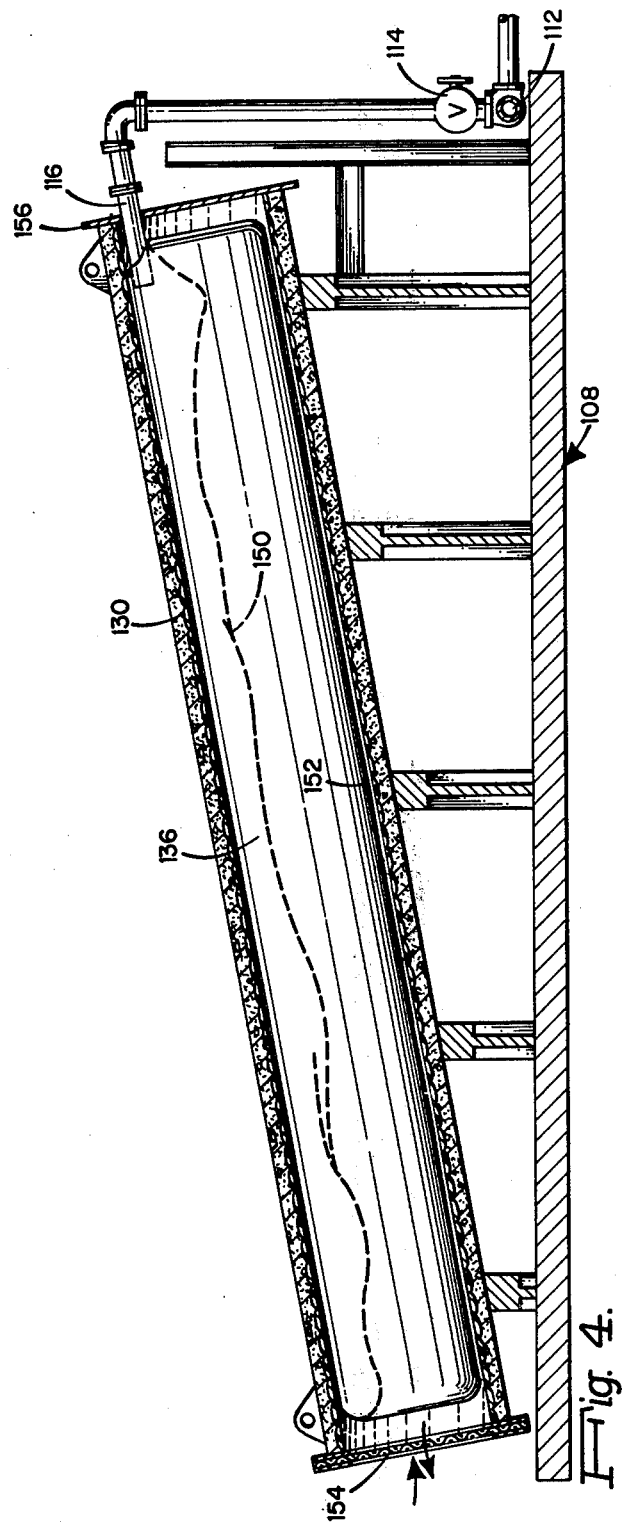

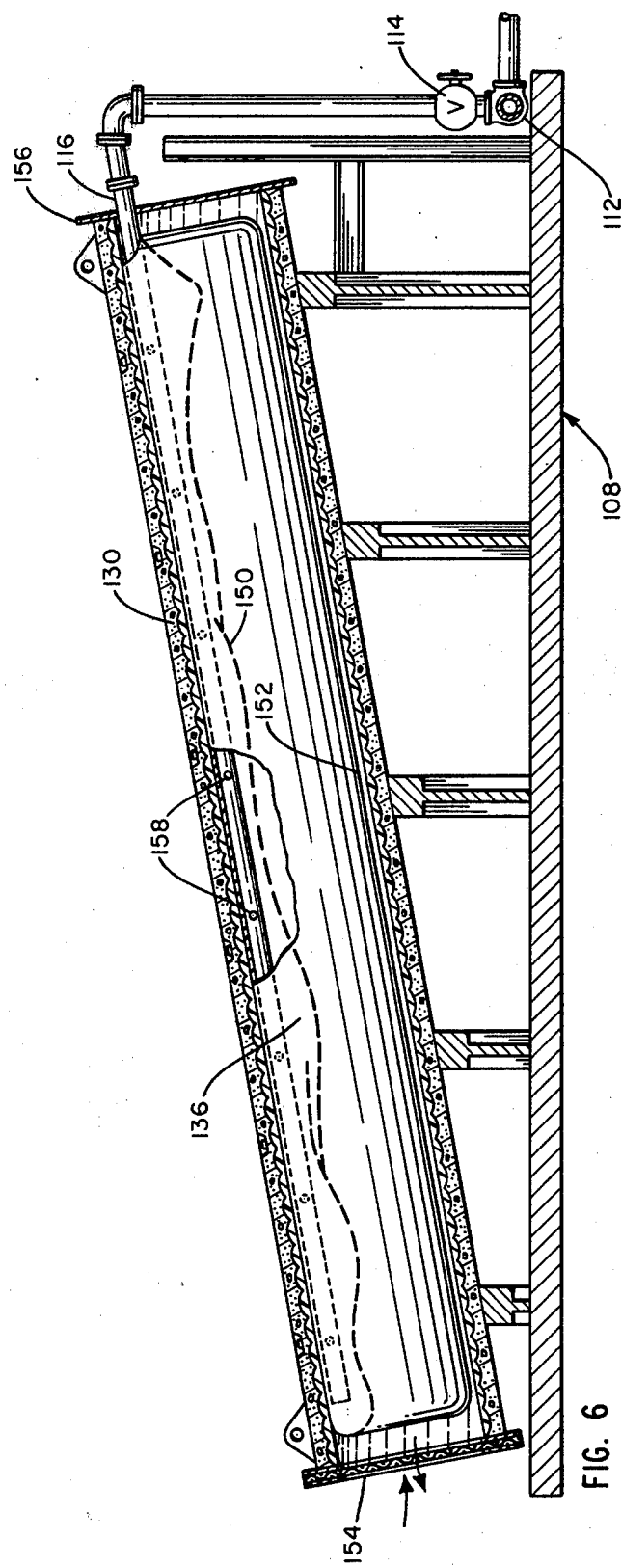

UNDERWATER STORAGE ASSEMBLY

This is a division of application Ser. No. 718,981, filed Aug. 30, 1976 now U.S. Pat. No. 4,141,377.

This invention relates to underwater storage containers and assemblies and more particularly, to underwater storage containers in which a membrane or bladder is provided to separate a fluid being stored, for example, petroleum products, from a pressure balancing fluid, for example, seawater.

BACKGROUND OF THE INVENTION

Underwater storage tanks have been used since at least as early as the Second World War for storing petroleum products underwater. During the 1940's, the primary purpose of maintaining underwater storage facilities was military, that is, to reduce the likelihood of destruction of the facility in the event of an air attack and to provide boats and ships with offshore refueling facilities so that they would not be required to return to port in order to refuel.

Today, underwater storage facilities generally have an entirely different primary purpose. The continued growth of offshore drilling and exploration, coupled with the necessity of exploring further from shore, often demands the ability to store the petroleum crude or processed petroleum at the drilling site. This enables the producer to store his output until a tank or barge load is collected, rather than have to pump it directly into a barge or other seagoing storage vessel on a daily basis. The latter would unnecessarily detain the vessel because one day's production is generally less than a full load.

Typically, a storage facility, according to the invention, can be provided which will store several days production output of an offshore facility. A barge or other vessel can then stop at the facility once a week or so to receive the contents of storage tanks.

In addition to the usual manufacturing problems with which the oil producer is faced on land, enviornmental considerations are now of considerable importance in connection with offshore drilling. Consequently, it is a paramount concern that adequate safety precautions be taken to prevent any leakage or spillage of petroleum into the sea. As a result, production facilities located offshore are generally equipped with elaborate systems to ensure that any seawater which becomes mixed with petroleum crude is filtered and cleaned prior to being returned to the sea.

It is therefore a primary object of this invention to provide an underwater storage assembly which is enviornmentally safe, which is easy to operate, which requires only modest pumping requirements, and which is capable of storing several days output of an offshore production plant. Further objects include providing an underwater storage assembly which is relatively simple to install, and simple to disassemble and clean as necessary.

SUMMARY OF THE INVENTION

The invention features an underwater storage assembly having at least one storage tank, the tank being maintained in position on a skid assembly so that one end of each tank is positioned higher than the other end. Each tank includes at least one rigid cylindrical wall defining an inner chamber. A flexible membrane is secured to the inside of the inner cylindrical wall for dividing the inner chamber into first and second compartments to provide a fluid-tight compartment into which a fluid can be received for storage and from which it can be discharged at a later time. The tank is provided with a passage for allowing water to pass freely between the first compartment and the surrounding environment. A filtering apparatus associated with each tank is provided for preventing debris and sea organisms from entering a tank through its respective passage. Each tank is also provided at its higher end with means for discharging fluids into and out of the second compartment.

In other aspects, the invention features a tubular membrane the internal portion of which defines the extent of the second compartment. In particular embodiments, each tank has two cylindrical walls, an inner wall, preferably of corrugated steel, and a dense outer wall, such as concrete, to compensate for the buoyancy of the assembly when it is filled with petroleum.

In a preferred embodiment, the invention features an assembly in which each tank includes two concentric cylindrical walls dispcsed contiguously with one another and having the membrane secured to the inside of the inner wall along at least an axial length of the tank. When the membrane is substantially planar, the membrane may be secured to the inner wall along lines substantially diametrically opposed to one another. The inner wall is preferably provided with a smooth or non-tearing inner surface so that the membrane, which is relatively fragile, is not abraded or torn. The assembly also includes a manifold pipe adjacent the higher end of each tank and connected to receive and discharge fluid between the tanks and equipment positioned above the surface of the water. A feeder pipe is provided between the fluid tight compartment of each tank, through a remotely controlled valve, to the manifold.

In another aspect of the invention, there is featured a feeder pipe which extends substantially the length of the tank parallel to a longitudinal axis of the tank. The feeder pipe in one aspect is perforated at a plurality of locations along a substantial portion of its length. The feeder pipe preferably connects to the manifold through a remotely controlled valve.

SUMMARY OF THE DRAWINGS

Other objects, features and advantages of the invention will appear from the following description of particular embodiments of the invention taken together with the attached drawings thereof, in which:

FIG. 3 is a perspective drawing of a particular embodiment employing four tanks according to the invention;

FIG. 4 is a broken longitudinal sectional view of a tank according to the invention;

FIG. 5 is a broken transverse sectional view of a tank according to the invention; and FIG. 6 is a broken longitudinal sectional view of a tank according to another embodiment of the invention.

DESCRIPTION OF A PREFERRED EMBODIMENT

Figure 1:
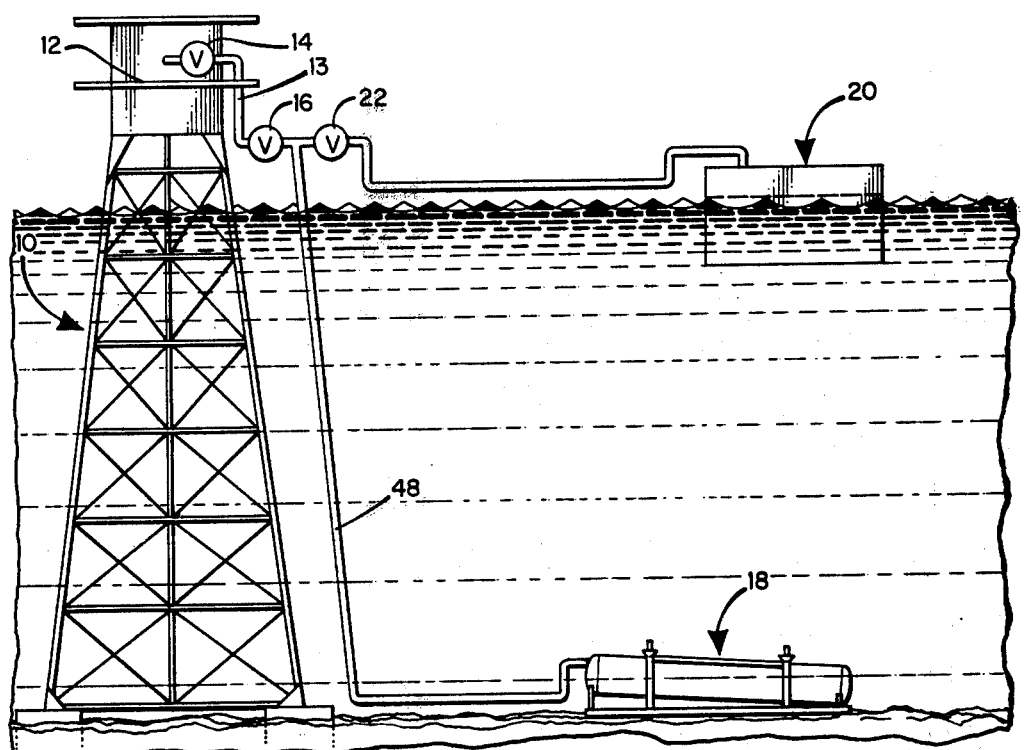
FIG. 1 is a schematic representation of a typical offshore drilling facility.

Referring to FIG. 1, a typical offshore drilling operation includes a platform 10 secured solidly in ground beneath the sea and on which is provided a production deck 12. Lines 13 extend from the production deck 12 through valves 14 and 16 to an underwater storage assembly 18 and to a vessel 20, for example, a transport barge. The transport barge is typically connected to the production deck through another valve 22.

Typically, the underwater storage assembly 18 lies on and is secured to the relatively horizontal bottom of the sea at a substantial distance below the surface of the sea. The production deck may be substantially elevated above the surface of the sea.

Figure 2:
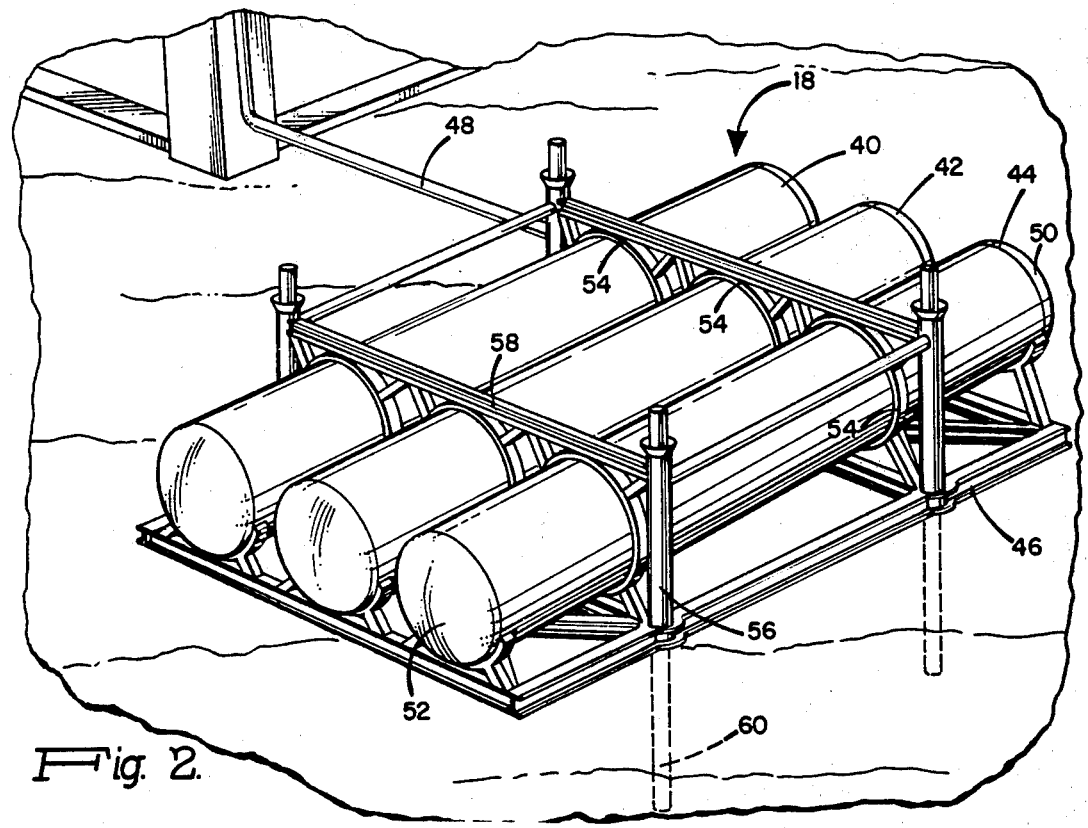
FIG. 2 is a perspective drawing of a particular embodiment employing three tanks according to the invention.

Referring to FIG. 2, in one particular embodiment, the assembly 18 includes three storage tanks 40, 42, 44 mounted on and secured to a skid 46. Line 48 extending from production deck 12 to underground storage assembly 18 carries crude to and from the storage assembly. The tanks are secured in position by skid 46 so that one end of each tank, for example, an end 50 of tank 44, is raised above the level of the other end 52 of the same tank. In this embodiment, the tanks are held in place by encircling bands 54. Bands 54 are secured to hollow vertical pile guides 56 by cross supports 58. The entire skid assembly is secured on the bottom surface of the sea by piles 60 driven into the bottom surface of the sea. In this particular embodiment, the piles pass through the interior of hollow vertical pile guides 56.

Typically, the entire storage assembly may be lowered in place by using a derrick mounted on a barge. Alternatively, the skid may be first lowered in place and each tank lowered separately. Once the entire assembly is on the bottom of the sea, the piles are driven into place to secure it against movement due, for example, to waves or other water disturbances.

FIG. 3 shows a second embodiment of the invention in which four cylindrical storage tanks 100, 102, 104 and 106 are secured in place on a skid 108. The skid is secured to the bottom of the sea by piles 110 driven through guide collars 111. There is also provided a pipe manifold 112 which connects line 48, through remotely controlled valves 114 and feeder pipes 116 (See FIG. 4) to the individual storage tanks.

The storage tanks may be of any desired construction. In this particular embodiment, the storage tanks include an outer shell 130 which provides both structural support for the tank and which is of sufficiently high density to provide the weight necessary to counteract the buoyancy of the tank when filled, for example, with petroleum. Preferably the outer shell is made of concrete. The tank also has an inner shell 132, preferably corrugated steel, which is disposed contiguous to the outer shell and which preferably has a smooth plastic or elastomeric coating applied to its inner surface. This surface or lining insures that a cylindrical membrane 136, attached to the interior of the tank, is not likely to tear or rupture through engagement with its supporting shell. In this way, membrane 136 which is relatively fragile is not likely to be torn. The membrane in combination with the inner wall of the tank divides the interior chamber defined by the inner wall into two compartments. Membrane 136 is preferably rubber or another elastomeric material and preferably has internal reinforcing. The membrane 136 is thus flexible and is impervious to the passage of either seawater or petroleum products. In general, the membrane is impervious to the fluids on either of its sides. The membrane is preferably secured to the tank walls by nylon bolts 138 on which are placed embedded stiffner plates 140.

In the preferred embodiment, the membrane is attached to the tank wall at a plurality of points located along a line, parallel to the longitudinal axis of the tank, and at the topmost point of the tank. In this manner tensile stresses on the membrane are minimized, for example under full load, and the membrane is less likely to rupture.

The membrane may be of any desired configuration so long as it forms, either by itself or in combination with the inner wall of the tank, a fluid-tight compartment. In particular, membrane 136, (FIG. 4) has a tubular structure. The membrane is flexible enough to collapse upon itself such as shown by the dashed line 150 and is strong enough to hold a full load of fluid such as petroleum products as indicated by solid line 152. The membrane however is sized so that when it is fully loaded, it has no folds and just fits within the confines of the tank.

In other embodiments, the membrane might be essentially planar so that if forms a fluid-tight compartment only in combination with a portion of the inner wall of the cylindrical tank. In such an embodiment, the membrane must still be of sufficient size and flexibility to fully collapse upon the inner wall portion of the tank when the tank is drained.

Preferably, at one end of the tank, the lower end, a passage is provided so that seawater is free to pass into and out of the interior of the tank except for the fluid-tight compartment. In this embodiment, the entire bottom end of the tank is open and a filter 154, for example, a screen, is provided in order to prevent sea organisms and debris from entering the tank and perhaps puncturing the membrane or clogging the components of the tank.

At the other or top end of the tank, a cap plate 156 is provided through which feeder pipe 116 extends. The feeder pipe 116, shown as being relatively short, passes through cap plate 156 and then through the membrane while maintaining the integrity of the fluid-tight compartment. In other embodiments (FIG. 6), it may be desirable to extend pipe 116 essentially the length of the tank parallel to the longitudinal axis of the tank and to perforate it along its length in a plurality of locations 158 so that a collapsing membrane does not tend either to block the entrance to pipe 116 or to isolate pockets of crude which would then be left within a portion of the supposedly discharged tank.

Feeder pipe 116, when extended along the length of the tank, can be used to hold the membrane in place. The pipe thus acts like a spine in supporting the membrane.

In operation, the tank is initially empty and the membrane is collapsed upon the inner side walls of the tank. The tank is essentially filled with seawater. As fluid, petroleum crude, is pumped into the tank, the fluid-tight compartment formed by the membrane and the inner surface of the tank fills, forcing seawater out through the filtered passageway. When the tank is full, the configuration of the membrane is similar to that shown by the solid line 150 in FIG. 4.

The reverse process, that of discharging or unloading from the storage tank, can be performed without a pump. The hydrostatic pressure of seawater at a depth of 200 feet, is sufficient to force the petroleum crude, which has a smaller density than the seawater, from the fluid-tight compartment. If desired, the flow rate can be increased by providing additional pumping facility.

SUMMARY OF ADVANTAGES AND UNOBVIOUSNESS OF THE INVENTION

The underwater storage assembly 18 is particularly advantageous in providing a simple, trouble free, and structurally sound apparatus.

The particular structure of securing the membrane to the tank wall is advantageous in reducing tensile forces which tend to rupture or tear the membrane. In particular, the spinelike structure whereby the membrane is secured to the topmost portion of the tank wall along a line parallel to the longitudinal axis of the tank provides a particularly advantageous attachment system.

The disclosed underwater storage assembly combines elements to provide an advantageous system which does not require sophisticated or complex equipment to ensure that the entire stored contents of the assembly are discharged.

The filtered passageway protects the inner chamber of the tank from debris and other organisms.

The skid assembly stabilizes the entire underwater storage assembly and orients the storage tank so that one end is higher than the other. The internal surface of the storage tank has a smooth coating to help prevent tearing or rupturing of the membrane.

The elements described above combine to function in a non-obvious manner. In particular, the advantages flowing from the combination of a storage tank inclined at an angle to the horizontal or from the extension of the feeder pipe in combination with the spine supporting structure to support the membrane, provide for an unexpectedly reliable tank structure.

In describing the advance in the art presented by this invention, it is recognized that other efforts have been made in the offshore art to facilitate offshore storage. By example, Glazier, U.S. Pat. No. 3,727,418 describes an underwater storage assembly for liquid gases employing a planar type membrane coupled with balancing fluids. Haeber U.S. Pat. No. 3,292,695 shows an assembly of storage tanks not employing a membrane for storing underwater oil which is obtained from offshore wells. However these devices do not combine the various structural features of the present invention and do not enjoy the advantages found in the present invention.

It will occur to those skilled in the art that there are other ways of attaching the membrane to the rigid wall or shell of the tank and that there are other ways of configuring the membrane. These alternate embodiments of the invention are within the scope of the invention and are within the following claims.

What is claimed is:

1. An underwater storage assembly comprising
   at least one cylindrical storage tank,
   a skid assembly for maintaining each tank in position so that a first end of the tank is positioned higher than a second end of the tank,
   said skid including pile receiving means for engagement with piles for securing the skid assembly in place at the bottom of the sea,
   each tank having
      at least one rigid cylindrical wall defining an inner chamber,
      a flexible membrane secured to the inside of said one cylindrical wall for dividing the inner chamber into a first and a second compartment,
      a passage for allowing water to pass freely into and from said first compartment from the environment,
      a filtering apparatus associated with each tank for preventing debris and sea organisms from entering the tank through the respective passage, and
      at said first end, means for receiving fluids into and discharging fluids from said second compartment, said second compartment being capable of storing said fluids and said second compartment being fluid-tight, each receiving and discharging means including a feeder pipe extending substantially the entire length of the second compartment parallel to the axis of the tank and said feeder pipe being perforated at a plurality of locations along the portion of its length within the tank.

2. An underwater storage assembly comprising
   a plurality of cylindrical storage tanks having two contiguous, concentric cylindrical walls,
   a skid assembly for maintaining each tank in position so that a first end of the tank is positioned higher than a second end of the tank, said skid assembly including a pile receiving means engageable with driven piles for securing the skid assembly to the bottom of the sea,
   a manifold positioned adjacent each tank at its higher end and connected to receive and discharge fluid to equipment positioned above the surface of the water,
   each tank having
      a rigid inner wall defining an inner chamber, said inner wall being provided with a smooth inner surface,
      a flexible membrane secured to the inside of said inner wall for dividing the chamber into first and second compartments,
      said membrane being secured to said inner wall at least along an axial length of the tank and said membrane in cooperation with said inner wall being operative to make said second compartment fluid-tight,
      a passage for allowing seawater to pass freely into and out of said first compartment from surrounding environment,
      a screened filtering apparatus associated with each tank for preventing debris and sea organisms from entering the tank through the passage,
      means for receiving fluids into and discharging fluids from said second compartment, said means including
      a feeder pipe extending substantially the entire length of the second compartment and being perforated at a plurality of locations along a substantial portion of its length within the second compartment, said feeder pipe extending from said second compartment and connecting with said manifold through a remotely controlled valve, said valve operative to control the flow of fluids to and from the second compartment through the feeder pipe, and
      the second cylindrical wall being composed of a dense material to counterbalance the buoyancy of a fluid stored in the tank.

3. An underwater storage assembly comprising
   at least one cylindrical storage tank having a first end and a second end,
   a frame assembly for maintaining each tank in position, said frame including pile receiving means for engagement with piles for securing the frame assembly in place at the bottom of the sea, each tank having
- at least one cylindrical wall defining an inner chamber,
- a flexible tubular membrane secured to the inside of said one cylindrical wall at a plurality of points along a line parallel to a longitudinal axis of said tank, and dividing the inner chamber into a first and a second compartment,
    - said membrane, when in an expanded state within said chamber having no folds along its circumference,
- a passage for allowing water to pass freely into and out of said first compartment,
- a filtering apparatus associated with each tank for preventing debris and sea organisms from entering the tank through the respective passage, and
- at said second end, means for receiving fluids into and discharging fluids from said second compartment, said second compartment being capable of storing said fluids and said second compartment being fluid-tight, said fluid receiving means including a feeder pipe extending substantially the length of said tank parallel to a longitudinal axis of said tank and said feeder pipe in combination with securing hardware securing said membrane in place.

* * * * *